United States Patent [19]
Yamaguchi

[11] Patent Number: 5,611,240
[45] Date of Patent: Mar. 18, 1997

[54] LEVEL DETECTOR

[75] Inventor: Chikazi Yamaguchi, Handa, Japan

[73] Assignees: Toyota Tsusho Corporation, Nagoya; Beam Electronics Company Limited, Handa; Toyotsu S.K. Company Limited, Ichinomiya, all of Japan; a part interest

[21] Appl. No.: 328,571

[22] Filed: Oct. 24, 1994

Related U.S. Application Data

[63] Continuation-in-part of Ser. No. 42,108, Apr. 2, 1993, abandoned.

[30] Foreign Application Priority Data

| Apr. 3, 1992 | [JP] | Japan | 4-081982 |
| Apr. 3, 1992 | [JP] | Japan | 4-081983 |

[51] Int. Cl.⁶ .......................... G01F 23/26; G01R 27/26
[52] U.S. Cl. ............................. 73/304 C; 324/663
[58] Field of Search ...................... 73/304 C; 324/662, 324/663

[56] References Cited

U.S. PATENT DOCUMENTS

| 3,777,257 | 12/1973 | Geisselmann | 324/663 |
|---|---|---|---|
| 4,555,941 | 12/1985 | Fathauer et al. | 73/304 C |
| 4,806,847 | 2/1989 | Atherton et al. | 73/304 C |
| 4,820,973 | 4/1989 | Alvarez | 73/304 C |
| 4,841,227 | 6/1989 | Maier | 73/304 C |
| 4,875,497 | 10/1989 | Worthington | 73/304 C |
| 5,051,921 | 9/1991 | Paglione | 73/304 C |
| 5,088,325 | 2/1992 | Eichberger et al. | 73/304 C |
| 5,156,047 | 10/1992 | Tuma et al. | 73/304 C |

FOREIGN PATENT DOCUMENTS

| 1056922 | 3/1954 | France | 73/304 C |
|---|---|---|---|
| 3720473 | 12/1988 | Germany | 73/304 C |
| 3824231 | 1/1990 | Germany | 73/304 C |
| 0107126 | 8/1981 | Japan | 73/304 C |
| 0243318 | 12/1926 | United Kingdom | 73/304 C |
| 0581596 | 10/1946 | United Kingdom | 73/304 C |
| 0681770 | 10/1952 | United Kingdom | 73/304 C |

OTHER PUBLICATIONS

Carmichael, J.M. et al., "Liquid Level Detector," IBM Technical Disclosure Bulletin, vol. 16, No. 3, p. 775 (Aug. 1973).

*Primary Examiner*—Diego F. F. Gutierrez
*Attorney, Agent, or Firm*—Jacobson, Price, Holman & Stern, PLLC

[57] ABSTRACT

A level detector includes a level detecting capacitor, an oscillating circuit, and an amplifying circuit. The level detecting capacitor includes a pair of continuously extended electrodes separated by a predetermined distance and disposed at a predetermined position in a container adapted for accommodating a dielectric fluid having levels which are to be detected therein. The oscillating circuit is adapted to apply an alternating voltage of a constant frequency to the level detecting capacitor by way of an impedance element adapted to provide signal voltages. The amplifying circuit is adapted to amplify voltage drops at the impedance element so as to output a signal corresponding to the level of the dielectric fluid. Thus, the level detector can output signal voltages of high linearity and dependant on the fluid level variations using a simple circuit arrangement.

16 Claims, 3 Drawing Sheets

LEVEL DETECTOR

This is a continuation-in-part of application Ser. No. 08/042,108, filed Apr. 2,1993, now abandoned.

BACKGROUND OF THE INVENTION

1. Field of the Invention

The present invention relates to a level detector which is adapted to detect fluid levels continuously through the electrostatic capacitance variations between a pair of electrodes.

2. Description of the Prior Art

As set forth in Japanese Examined Patent Publication (KOKOKU) No. 62-18,004, there is a conventional level detector which detects the electrostatic capacitance variations between a pair of electrodes resulting from the liquid level variations in order to detect the liquid levels. This publication discloses that the electrostatic capacitance variations are detected through the frequency variations at the RC (Resistance-Capacitance) oscillating circuit in this conventional level detector.

However, when the electrostatic capacitance variations between a pair of the electrodes resulting from the liquid level variations are detected through the oscillating frequency variations, there is no linear relationship between the oscillating frequency and the electrostatic capacitance "C" because "ω" is equal to "$(LC)^{-1/2}$". For instance, the signal voltages undergoing the F/V (Frequency/Voltage) conversion do not have a linear relationship with the liquid levels which virtually have a linear relationship with the electrostatic capacitance between the electrodes. Accordingly the subsequent signal processing is very complicated.

The present invention has been developed in view of the aforementioned drawback of the conventional level detector. It is therefore a primary object of the present invention to provide a level detector which exhibits a good linearity between fluid level variations and output signal voltage variations and which has a simple construction as well.

A level detector according to the present invention comprises:

- a level detecting capacitor including a pair of continuously extended electrodes, the electrodes being separated by a predetermined distance and disposed at a predetermined position in a container adapted for accommodating a dielectric fluid having levels which are to be detected;
- an oscillating circuit adapted to apply an alternating voltage of a constant frequency to the level detecting capacitor by way of an impedance element, the impedance element being adapted to provide signal voltages; and
- an amplifying circuit adapted to amplify voltage drops at the impedance element so as to output a signal corresponding to the level of the dielectric fluid.

The present level detector operates as follows: The alternating voltage output by the oscillating circuit is applied to a series circuit constituted by the impedance element and the level detecting capacitor. Then, the voltage drop present at the impedance element is amplified by the amplifying circuit and is output as a signal which corresponds to the level of the dielectric fluid having levels which are to be detected. When the impedance of the impedance element is "Z," the electrostatic capacitance of the level detecting capacitor is "C," and the angular frequency of the alternating voltage is "ω," the linearity of the signal voltages output by the amplifying circuit can be improved by reducing "ωCZ" to less than 1 as much as possible, preferably to 0.1 or less.

As having been described so far, in the present level detector, the alternating voltage output by the oscillating circuit is applied to the series circuit constituted by the impedance element and the level detecting capacitor. The voltage drop present at the impedance element is then output as a signal which corresponds to the level of the dielectric fluid. As a result, the present level detector can output signal voltages of high linearity which depend on the fluid level variations with a simple circuit.

Further, the level detecting capacitor of the present level detector can be constructed as follows: The level detecting capacitor can include an outer cylinder and an inner cylinder which are disposed concentrically. The outer cylinder can be adapted to constitute an external electrode to which the alternating voltage is supplied from the oscillating circuit, and the inner cylinder can be disposed concentrically inside the outer cylinder and is adapted to constitute an inner electrode from which signal voltages are transmitted to the amplifying circuit.

Furthermore, the level detecting capacitor of the present level detector can be modified as follows: The level detecting capacitor can include an outer cylinder and an inner cylinder which are disposed concentrically, the outer cylinder being adapted to constitute an external electrode which is connected to a constant voltage line. The inner cylinder can be disposed concentrically inside the outer cylinder concentrically and is adapted to constitute an inner electrode which is connected to a terminal of the impedance element.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

Figure 1:
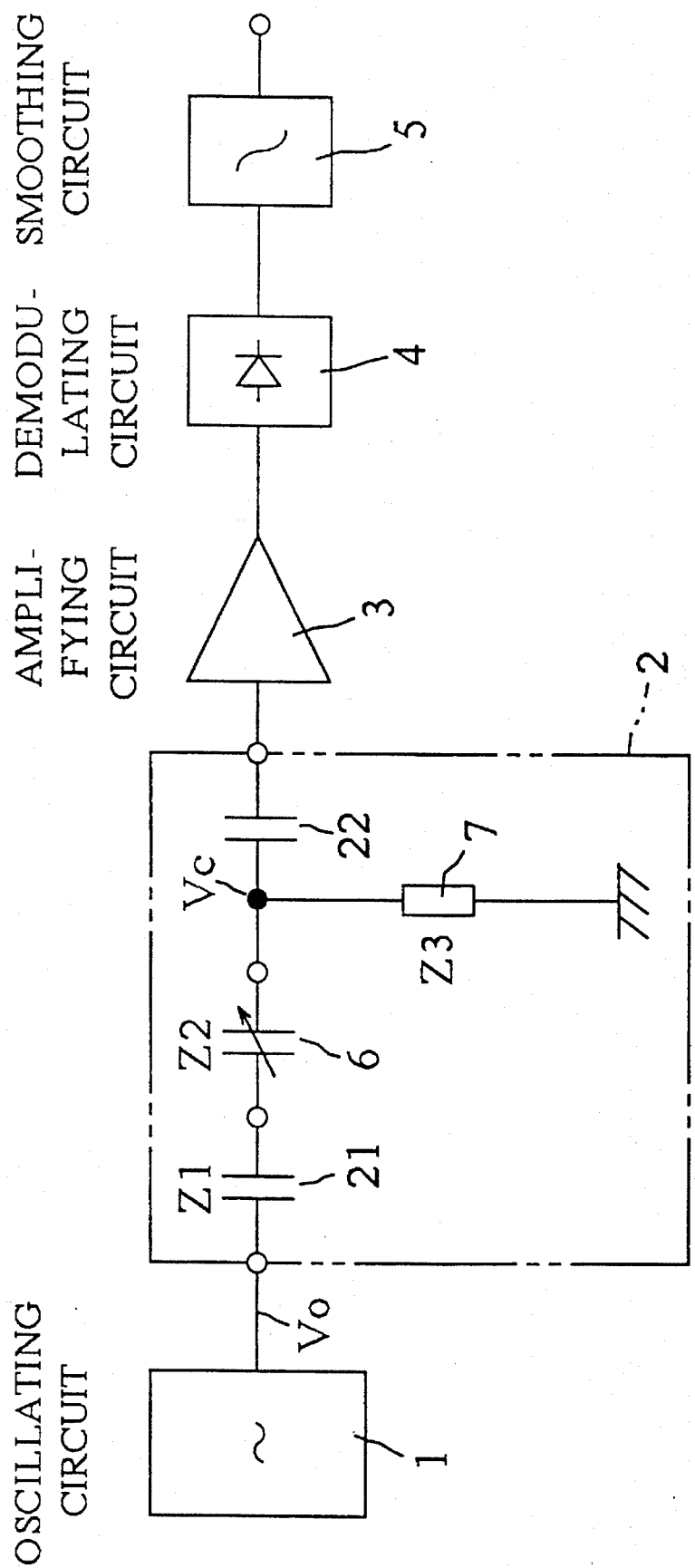
FIG. 1 is a circuit diagram illustrating a First Preferred Embodiment of a level detector according to the present invention.

FIG. 1 illustrates the First Preferred Embodiment of the level detector according to the present invention. The level detector comprises an oscillating circuit 1, a capacitor circuit 2 adapted for use in detecting liquid levels, an amplifying circuit 3, a demodulating circuit, and a smoothing circuit 5.

The oscillating circuit 1 is a circuit which is adapted to output a sine wave alternating current of a predetermined frequency. Of course, the oscillating circuit be adapted to output an alternating voltage having other wave forms.

The capacitor circuit 2 includes a first direct current cutoff capacitor 21, a level detecting capacitor 6, a second direct current cutoff capacitor 22, and an impedance element 7 which are connected in series in this order. A terminal of the impedance element 7 is connected to a connection between the level detecting capacitor 6 and the second direct current cutoff capacitor 22 while its other terminal is grounded.

The amplifying circuit 3 is a linear amplifying circuit which is adapted to exhibit a high input impedance and includes a FET (Field-Effect Transistor) input type operational amplifier.

Since the constructions of the demodulating circuit and the smoothing circuit 5 are well known, they will not be described herein. The aforementioned component members other than the level detecting capacitor 6 are accommodated in an enclosed case (not shown).

Figure 2:
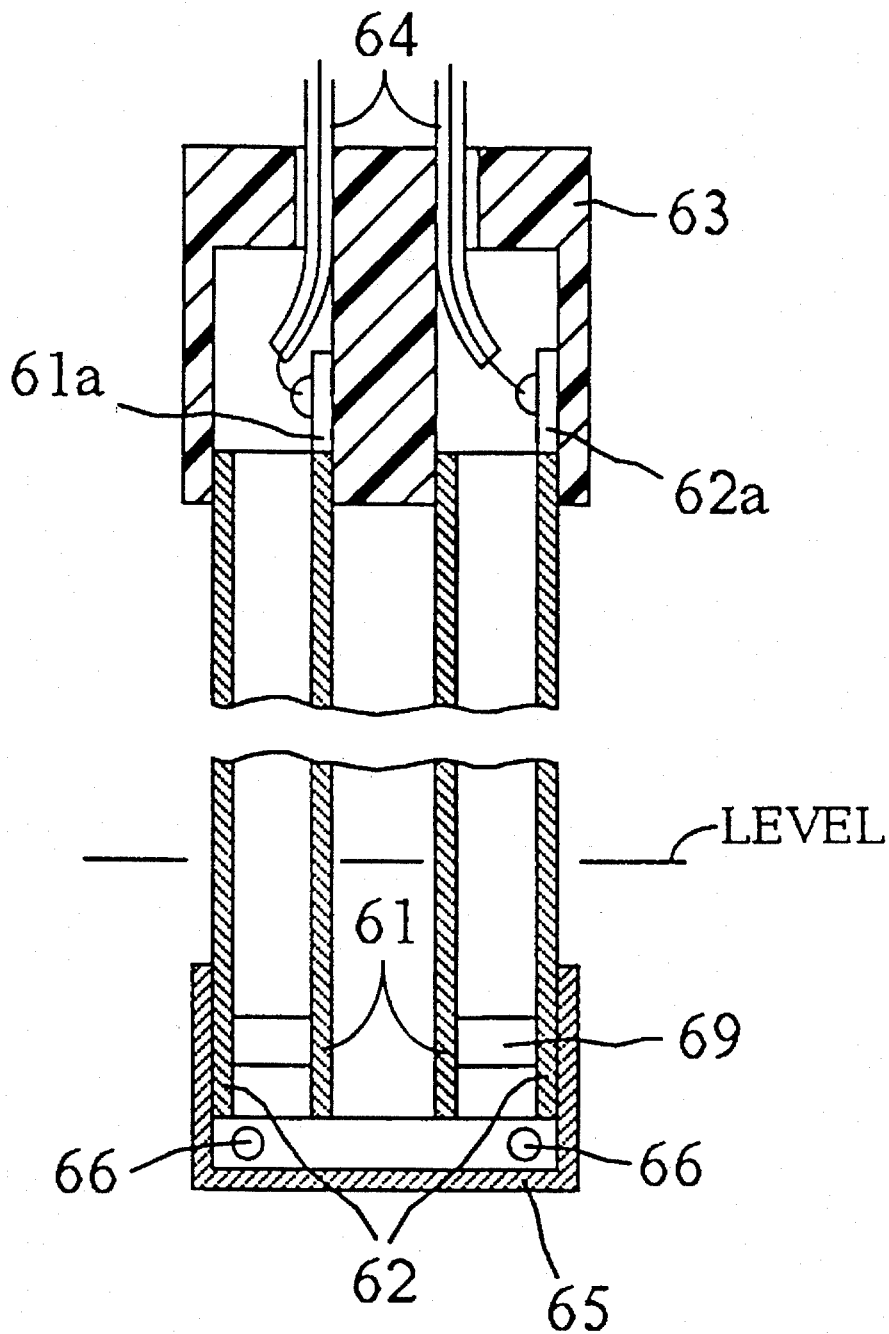
FIG. 2 is a cross-sectional view of a level detecting capacitor of the First Preferred Embodiment of the present level detector.

The capacitor circuit 2 will be hereinafter described in detail. As illustrated in FIG. 2, the level detecting capacitor 6 of the capacitor circuit 2 includes an inner electrode 61 having a cylindrical shape, and an outer electrode 62 also having a cylindrical shape. The inner electrode 61 and an outer electrode 62 are disposed concentrically at a predetermine position in a container (not shown) which holds a dielectric liquid (not shown), e.g., gasoline, or the like, having levels which are to be detected. The electrode 61 and 62 are extended down into the container. A cover 63 made of resin is-engaged with the upper portions of the inner electrode 61 and the outer electrode 62 and includes a center solid cylinder and an outer hollow cylinder which are extended down from the top concentrically The center solid cylinder is fitted into the inner electrode 61, and the outer hollow cylinder is fitted around the cute electrode 62. A spacer 69 iS disposed at the lower portions of the inner electrode 61 and the outer electrode 62 so as to provide a radial clearance of a predetermined dimension between the electrodes 61 and 62.

The inner electrode 61 and the outer electrode 62 are provided with claws 61a and 62a which extend upwardly at their upper ends. The claws 61a and 62a are respectively soldered to an end of a pair of signal cables 64. Each of the signal cables 64 includes a wire-net shielded line, and each is extended into the aforementioned enclosed case.

A cap 65 made of resin or metal is engaged with and fixed around the lower end of the outer electrode 62. The cap 65 is provided with small holes 66 which are opened in the side wall so as to let the dielectric liquid in and out. The small holes 66 operate as a mechanical low-pass filter.

The operations of the First Preferred Embodiment of the present level detector will be hereinafter described. The alternating voltage output by the oscillating circuit 1 is divided into the voltages which appear at the first direct current cutoff capacitor 21, the level detecting capacitor 6 and the impedance element 7. Since the impedance of the second direct current cutoff capacitor 22 is smaller than that of the impedance element 7, and since a large impedance is exhibited between the input terminal and the grounded terminal of the amplifying circuit 3, the electric current flowing partially to the second direct current cutoff capacitor 22 will be hereinafter considered negligible.

When the dielectric liquid undergoes a level variation, the electrostatic capacitance variation "$\Delta C$" of the level detecting capacitor 6 including the inner and outer electrodes 61 and 62 occurs substantially in proportion to the level variation "$\Delta L$".

When the impedance of the first direct current cutoff capacitor 21 is "$Z_1$," the impedance of the level detecting capacitor 6 is "$Z_2$" and is equal to $(1/j\omega C)$, the impedance of the impedance element 7 is "$Z_3$," the oscillating circuit 1 outputs the alternating voltage of "$V_o$," and the output impedance of the oscillating circuit 1 is negligibly small, the signal voltage $V_c$ (or the partial voltage $V_c$) at the connection between the level detecting capacitor 6 and the impedance element 7, i.e., the voltage drop at the impedance element 7, can be expressed by the following equation:

$$V_c = [Z_3 / \{Z_1 + (1/j\omega C) + Z_3\}] \times V_o.$$

Further, the equation can be transformed to the following equation:

$$V_c = (j\omega C)(Z_3)(V_o) / \{1 + (j\omega C)(Z_1 + Z_3)\}.$$

When the value $(j\omega C)(Z_1+Z_3)$ is adjusted to considerably smaller than 1, for instance, to 0.1 or less, $V_c$ can be approximated to $(j\omega C)(Z_3)(V_o)$. Thus, the signal voltage "$V_c$" is proportional to the electrostatic capacitance "C" of the level detecting capacitor 6. Since the variation "C" of the electrostatic capacitance "C" is in proportional to the level variation "$\Delta L$" as aforementioned, the variation of the signal voltage "$V_c$" can be regarded as proportional to the level variation "$\Delta L$."

In other words, the values "$\omega$," "C," "$Z_1$" and "$Z_2$" are set smaller in order to satisfactorily establish the aforementioned approximation. In particular, the electrostatic capacitance of the first direct current cutoff capacitor 21 is set as large as possible. When the impedance element 7 includes a capacitor, its electrostatic capacitance is set as large as possible. On the contrary, when the impedance element 7 includes a resistor, its resistance is set as small a possible. However, when the resistance is too small, the signal voltage "$V_c$" decreases accordingly so that the S/N (Signal-to-Noise) ratio deteriorates. Therefore, the resistance should be selected so as not to deteriorate the S/N ratio.

The impedance value of the impedance element 7 is preferably changeable pursuant to the dielectric constant of the dielectric liquid or the length of the electrodes 61, 62 of the level detecting capacitor 6.

The signal voltage "$V_c$" is transmitted to the amplifying circuit 3 by way of the second direct current cutoff capacitor 22, and it is amplified by the amplifying circuit 3. The amplified signal voltage "$V_c$" is then demodulated by the demodulating circuit 4, and it is converted to a direct current by the smoothing circuit 5 for output purposes.

The first and second direct current cutoff capacitors 21 and 22 are provided in order to prevent a direct current from being applied to the level detecting capacitor 6. This helps avoid accidents resulting from direct current leakage.

In the First Preferred Embodiment of the present level detector, the level detecting capacitor 6 includes the inner electrode 61 having a cylindrical shape and the concentrically arranged outer electrode 62 as having a cylindrical shape. The inner electrode 81 is connected to the amplifying circuit 3 so as to constitute a detecting point for the signal voltage "$V_c$," and the outer electrode 62 is connected to the oscillating circuit 1. With this arrangement, the following extra advantageous effects are provided: Even when the parasitic capacitance between the outer electrode 62 and the container (not shown) is fluctuated by varying the installation position of the level detecting capacitance 6, the fluctuating parasitic capacitance is less likely to result in a signal voltage "$V_c$" variation, and external noise from high frequency source are less likely to be superimposed on the signal voltage "$V_c$."

Modified Versions of the First Preferred Embodiment

In the First Preferred Embodiment of the present level detector, it is possible to remove the first and second direct current cutoff capacitors 21 and 22. For example, when the first direct current cutoff capacitor 2 is removed, it is apparent from the above equations that the linearity can be improved.

Further, a resistor or a reactance element, e.g., a coil, or the like, can be substituted for the impedance element 7 including the capacitance. In particular, when a resistor is substituted for the impedance element 7, the inner electrode 61 of the level detecting capacitance 6 is grounded so as to allow the flow of direct current. As a result, the connection between the level detecting capacitor 6 and the impedance element 7 including a resistor and the cables are not charged electrostatically. Hence, the impedance element 7 including a resistor is advantageous in the prevention of the superimposition of external high frequency noise on the signal voltage "$V_c$" as well as in the provision of a safety precaution.

Furthermore, when the second direct current cutoff capacitance 22 is removed and when the input impedance of the amplifying circuit 3 is reduced, the reduced input impedance can substitute for the impedance of the impedance element 7.

Second Preferred Embodiment

Figure 3:
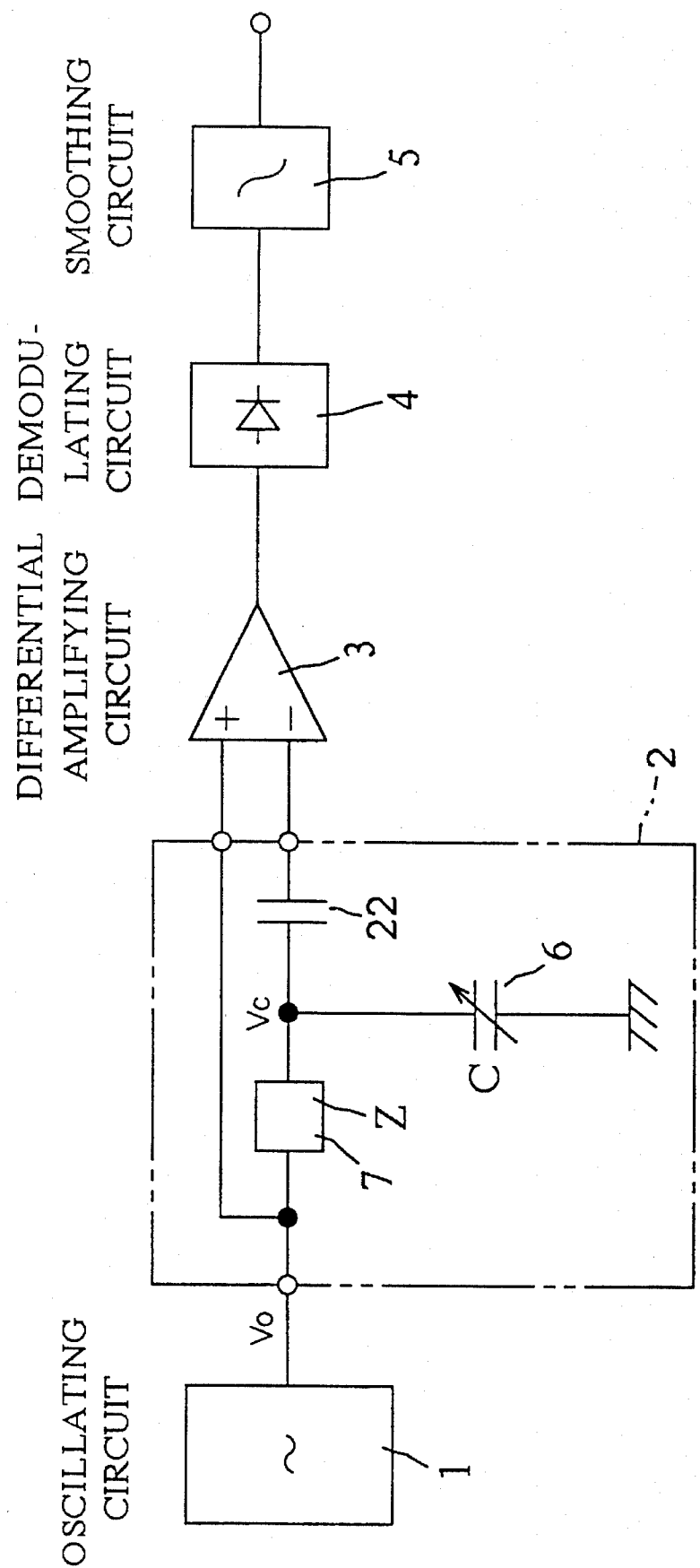
FIG. 3 is a circuit diagram illustrating a Second Preferred Embodiment of a level detector according to the present invention.

FIG. 3 illustrates the Second Preferred Embodiment of the level detector according to the present invention. The level detector comprises an oscillating circuit 1, a capacitor circuit 2 adapted for detecting liquid levels, a differential amplifying circuit B, a demodulating circuit 4, and a smoothing circuit 5.

The oscillating circuit 1 is a circuit which is adapted to output a sine wave alternating current having a predetermined frequency. Of course, the oscillating circuit can be adapted to output an alternating voltage having other wave forms.

The capacitor circuit 2 includes an impedance element 7 connected to the output terminal of the oscillating circuit 1 at a terminal, a level detecting capacitor 6 connected to the other terminal of the impedance element 7 at a terminal and grounded at its other terminal, and a direct current cutoff capacitor 22.

The direct current cutoff capacitor 22 connects the connection between of the impedance element 7 and the level detecting capacitor 6 with the minus input terminal of the differential amplifying circuit 3. The impedance element 7 includes a capacitor having an electrostatic capacitance less than that of the level detecting capacitor 6 by a factor of 1/20 or less.

The differential amplifying circuit 3 is a differential amplifying circuit which is adapted to exhibit a high input impedance, and includes an operational amplifier.

Since the constructions of the demodulating circuit a and the smoothing circuit 5 are well known, they will not be described herein. The aforementioned component members other than the level detecting capacitor 6 are accommodated in an enclosed case (not shown).

The level detecting capacitor 6 of the capacitor circuit 2 is identical with that of the First Preferred Embodiment of the present level detector. Hence, it will not be described herein.

The operations of the Second Preferred Embodiment of the present level detector will be hereinafter described. The alternating voltage output by the oscillating circuit 1 is divided into the voltages applied to the impedance element 7 and the level detecting capacitor 6. Since the impedance of the direct current cutoff capacitor 22 is large or since the sum of the impedance of the direct current cutoff capacitor 22 and the input impedance of the differential amplifying circuit 3 at the minus input terminal is large, the signal current flowing through the direct current cutoff capacitor 22 will be hereinafter considered negligible.

When the dielectric liquid undergoes a level variation, the electrostatic capacitance variation "$\Delta C$" of the level detecting capacitor 6 including the inner and outer electrodes 61 and 62 is substantially proportional to the level variation "$\Delta L$".

When the electrostatic capacitance of the level detecting capacitor 6 is "C," the impedance of the impedance element 7 is "Z," the oscillating circuit 1 outputs an alternating voltage of "$V_o$," and the output impedance the oscillating circuit 1 is negligibly small, the signal current "i" flowing in the impedance element 7 can be expressed by the following equation:

$$i=V_o/\{Z+(1/j\omega C)\}.$$

Hence, the voltage difference "$\Delta V$" between the terminals of the impedance element 7 can be expressed by the following equations:

$$\begin{aligned}\Delta V &= (Z)(V_o)/\{Z+(1/j\omega C)\} \\ &= (j\omega C)(Z)(V_o)/\{1+(j\omega C)(Z)\}\end{aligned}$$

When the value $(J\omega C)(Z)$ is adjusted to considerably smaller than 1, for instance, to 0.1 or less, "$\Delta V$" can be approximated to $(j\omega C)(Z)(V_o)$. Thus, the signal voltage "$V_c$" is proportional to the electrostatic capacitance "C" of the level detecting capacitor 6. Since the variation "$\Delta C$" of the electrostatic capacitance "C" is in proportional to the level variation "$\Delta L$" as aforementioned, the variation "$\Delta V$" of the signal voltage "$V_c$" can be regarded as proportional to the level variation "$\Delta L$."

In other words, the values "$\omega$," "C," "Z" are set smaller in order to satisfactorily establish the aforementioned approximation.

The signal voltage "$V_c$" is amplified by the differential amplifying circuit 3. The amplified signal voltage "$V_c$" is then demodulated by the demodulating circuit 4, and for is turned into a direct current by the smoothing circuit 5 for output purposes.

The direct current cutoff capacitor 22 is provided in order to prevent a direct current from being applied to the level detecting capacitor 6. For this purpose, the impedance element 7 is constituted by a capacitor. Thus, it is possible to avoid accidents resulting from the direct current leakage between the inner and outer electrodes 61 and 62 of the level detecting capacitor 6.

As illustrated in FIG. 2, also in the Second Preferred Embodiment of the present level detector, the level detecting capacitor 6 includes the inner electrode 61 having a cylindrical shape and the concentrically arranged outer electrode 62 also having a cylindrical shape. The inner electrode 61 is connected to the input terminal of the differential amplifying circuit 3 by way of the direct current cutoff capacitance 22, and the outer electrode 62 is grounded. With this arrangement, the following extra advantageous effects are provided: It is possible to ignore the parasitic capacitance between the outer electrode 62 and the container (not shown), and it is also possible to sharply reduce the parasitic capacitance between the internal connection of the circuitry and the container. As a result, even when the parasitic capacitances are fluctuated by varying the installation position of the level detecting capacitance 6, the fluctuating parasitic capacitances are less likely to affect variation of the signal voltage "$V_c$", and external high frequency noise is less likely to be superimposed on the signal voltage "$V_c$."

Modified Versions of the Second Preferred Embodiment

In the Second Preferred Embodiment of the present level detector, it is possible to remove the direct current cutoff capacitor 22.

Further, the inner electrode 6 of the level detecting capacitor 6 is not limited to the hollow cylindrical shape described above. That is, the capacitor 6 can be formed with a solid cylindrical shape. The dielectric liquid having levels which are to be detected can be a powdered substance.

Furthermore, a resistor or a reactance element, e.g., a coil, or the like, can be substitute for the impedance element 7 including the capacitance. However, when the combination of the impedance element 7 including a capacitor and the direct current cutoff capacitor 22 are employed, no direct current is transmitted to the level detecting capacitor 6. Thus, the combination provides an excellent safety precaution.

In using the signal voltage across both terminals of the impedance element, it is preferable that the level of the signal voltage become almost zero when the level of the dielectric fluid in the level detecting capacitor is zero (or empty). Furthermore, it is desirable that the signal voltage increases in accordance with an increase in the level of the dielectric fluid. The following method can be used to achieve the foregoing results.

In comparison, an impedance value of the impedance element which is connected in series with the level detecting capacitor is set in a range of $\frac{1}{10}$ to $\frac{1}{40}$ in relation to the impedance of the level detecting capacitor when empty. The percentages of the signal voltage is proportional to the percentages of the impedance value (in a range from $\frac{1}{10}$ to $\frac{1}{40}$). Thus, in the empty condition, the signal voltage across both terminals of the impedance element becomes very small, namely, 10 to 2.5% in relation to the signal voltage across the level detecting capacitor. When the ratio of the dielectric constant of the dielectric fluid is 8, the impedance of the level detecting capacitor, when submerged to its highest level (full), becomes $\frac{1}{8}$ in comparison with the impedance of the level detecting capacitor when empty. As a result, within the above range, the signal voltages change proportionately to the change in fluid level.

Furthermore, it is preferable that the impedance value of the impedance element be adjustable. When the impedance element comprises a variable resistor, a variable capacitor, or a variable impedance electrical network comprising plural switchable resistors or capacitors, the signal voltages can be easily controlled to vary in a desirable manner even if the detected fluid or the level detecting capacitor is changed.

Having now fully described the present invention, it will be apparent to one of ordinary skill in the art that many changes and modifications can be made thereto without departing from the spirit or scope of the present invention as set forth herein including the appended claims.

What is claimed is:

1. A level detector, comprising:

a level detecting capacitor for placement in a container of dielectric fluid wherein the level of the dielectric fluid is to be detected, said level detecting capacitor including a pair of substantially coextensive electrodes, the electrodes being separated by a predetermined distance;

an impedance element connected in series with said level detecting capacitor;

an oscillating circuit means for applying an alternating voltage having a constant angular frequency to said level detecting capacitor by way of said impedance element so as to provide signal voltages; and an amplifying circuit means for substantially linearly amplifying voltage drops at said impedance element so as to output a signal corresponding to the level of said dielectric fluid, wherein said level detecting capacitor includes an outer cylinder and an inner cylinder disposed concentrically with respect to the outer cylinder, the outer cylinder constituting an external electrode to which said alternating voltage is supplied from said oscillating circuit means, and the inner cylinder being hollow and concentrically disposed inside the outer cylinder, said inner cylinder constituting an inner electrode from which signal voltages are transmitted to said amplifying circuit means;

said level detecting capacitor further comprising a top cap and a bottom cap disposed at opposite longitudinal ends of said level detecting capacitor, said bottom cap having at least one hole for restricting the flow of fluid into and out of said level detecting capacitor to thereby operate as a mechanical low-pass filter, said top cap being substantially cup-shaped and arranged so as to snugly receive one of said opposite longitudinal ends of said outer cylinder, said top cap further comprising a centrally disposed projection which is partially received in said inner cylinder so as to secure said inner cylinder at said predetermined distance from the outer cylinder.

2. The level detector according to claim 1, wherein "$\omega CZ$" is no greater than 0.1 when the impedance of said impedance element is "$Z$," the electrostatic capacitance of said level detecting capacitor is "$C$," and the constant angular frequency of said alternating voltage is "$\omega$."

3. The level detector according to claim 1, wherein said top cap further comprises:

a first opening for a first wire which is electrically connected to said inner cylinder; and a second opening for a second wire which is electrically connected to the outer cylinder;

said first and second openings being disposed through said top cap immediately adjacent said centrally disposed projection but at opposite sides of said projection such that said projection separates said first and second wires from one another.

4. The level detector according to claim 1, and further comprising a spacer disposed between said inner and outer cylinders, said spacer having radial dimensions which correspond to said predetermined distance.

5. The level detector according to claim 1, wherein an impedance value of said impedance element is set in a range from 1/10 to 1/40 of an impedance value of said level detecting capacitor when said electrodes of said level detecting capacitor are not immersed in said dielectric fluid.

6. The level detector according to claim 5, wherein said impedance value of said impedance element is changeable pursuant to a dielectric constant of said dielectric fluid or a length of said electrodes of said level detecting capacitor.

7. The level detector according to claim 6, wherein said impedance element comprises at least one of a capacitor and a resistor.

8. The level detector according to claim 6, wherein said impedance element comprises one of a variable resistor, a variable capacitor and a switchable resistor-switch electrical network.

9. A level detector, comprising:

a level detecting capacitor for placement in a container of dielectric fluid wherein the level of the dielectric fluid is to be detected, said level detecting capacitor including a pair of substantially coextensive electrodes, the electrodes being separated by a predetermined distance;

an impedance element connected in series with said level detecting capacitor;

an oscillating circuit for applying an alternating voltage having a constant angular frequency to said level detecting capacitor by way of said impedance element so as to provide signal voltages; and an amplifying circuit means for substantially linearly amplifying voltage drops at said impedance element so as to output a signal corresponding to the level of said dielectric fluid;

wherein said level detecting capacitor includes an outer cylinder and an inner cylinder disposed concentrically with respect to the outer cylinder, the outer cylinder constituting an external electrode which is connected to a constant voltage line, and the inner cylinder being hollow and disposed concentrically inside the outer cylinder, said inner cylinder constituting an inner electrode which is electrically connected to a terminal of said impedance element;

said level detecting capacitor further comprising a top cap and a bottom cap disposed at opposite longitudinal ends of said level detecting capacitor, said bottom cap having at least one hole for restricting the flow of fluid into and out of said level detecting capacitor to thereby operate as a mechanical low-pass filter, said top cap being substantially cup-shaped and arranged so as to snugly receive one of said opposite longitudinal ends of said outer cylinder, said top cap further comprising a centrally disposed projection which is partially received in said inner cylinder so as to secure said inner cylinder at said predetermined distance from the outer cylinder.

10. The level detector according to claim 9, wherein "$\omega CZ$" is no greater than 0.1 when the impedance of said impedance element is "Z," the electrostatic capacitance of said level detecting capacitor is "C," and the constant angular frequency of said alternating voltage is "$\omega$."

11. The level detector according to claim 9, wherein said top cap further comprises:

a first opening for a first wire which is electrically connected to said inner cylinder; and a second opening for a second wire which is electrically connected to the outer cylinder;

said first and second openings being disposed through said top cap immediately adjacent said centrally disposed projection but at opposite sides of said projection such that said projection separates said first and second wires from one another.

12. The level detector according to claim 9, and further comprising a spacer disposed between said inner and outer cylinders, said spacer having radial dimensions which correspond to said predetermined distance.

13. The level detector according to claim 9, wherein an impedance value of said impedance element is set in a range from 1/10 to 1/40 of an impedance value of said level detecting capacitor when said electrodes of said level detecting capacitor are not immersed in said dielectric fluid.

14. The level detector according to claim 13, wherein said impedance value of said impedance element is changeable pursuant to a dielectric constant of said dielectric fluid or a length of said electrodes of said level detecting capacitor.

15. The level detector according to claim 14, wherein said impedance element comprises at least one of a capacitor and a resistor.

16. The level detector according to claim 14, wherein said impedance element comprises one of a variable resistor, a variable capacitor and a switchable resistor-switch electrical network.

* * * * *